(No Model.) 8 Sheets—Sheet 1.

G. BOEMERMANN.
CASH REGISTER, INDICATOR, AND CHECK PRINTER.

No. 486,577. Patented Nov. 22, 1892.

Fig. 1

WITNESSES:
Herbert Blossom
T. W. Wiman

INVENTOR:
George Boemermann
By Henry Connett
Attorney.

(No Model.) 8 Sheets—Sheet 2.

G. BOEMERMANN.
CASH REGISTER, INDICATOR, AND CHECK PRINTER.

No. 486,577. Patented Nov. 22, 1892.

Fig. 2.

WITNESSES:
Herbert Blofsom
F. W. Wiman

INVENTOR:
George Boemermann
By Henry Connett
Attorney.

(No Model.) 8 Sheets—Sheet 6.

G. BOEMERMANN.
CASH REGISTER, INDICATOR, AND CHECK PRINTER.

No. 486,577. Patented Nov. 22, 1892.

WITNESSES:
Herbert Blossom
F. W. ?

INVENTOR:
George Boemermann
By Henry Connett
Attorney.

(No Model.) 8 Sheets—Sheet 7.

G. BOEMERMANN.
CASH REGISTER, INDICATOR, AND CHECK PRINTER.

No. 486,577. Patented Nov. 22, 1892.

WITNESSES:
Herbert Blossom
J. W. Wiman

INVENTOR:
George Boemermann
By Henry Connett
Attorney.

(No Model.) 8 Sheets—Sheet 8.

G. BOEMERMANN.
CASH REGISTER, INDICATOR, AND CHECK PRINTER.

No. 486,577. Patented Nov. 22, 1892.

INVENTOR:
George Boemermann.
By Henry Connett
Attorney.

WITNESSES:
Peter A. Ross
Herbert Blossom

United States Patent Office.

GEORGE BOEMERMANN, OF BROOKLYN, NEW YORK.

CASH REGISTER, INDICATOR, AND CHECK-PRINTER.

SPECIFICATION forming part of Letters Patent No. 486,577, dated November 22, 1892.

Application filed December 22, 1891. Serial No. 415,843. (No model.)

*To all whom it may concern:*

Be it known that I, GEORGE BOEMERMANN, a citizen of the United States, and a resident of Brooklyn, in the county of Kings and State of New York, have invented certain Improvements in Cash Registers, Indicators, and Check-Printers, of which the following is a specification.

My invention relates to that class of cash-registers whereon the salesman registers the sum received for each sale. Some machines of this class effect several results when operated, namely: Numerals indicating the sum of money received are exposed to view, a gong is sounded, a cash-drawer is unlocked and pushed out, the amount received is added on an adding mechanism to the sum of the amounts previously received, and the amount received is printed on a numbered check or ticket and the latter protruded and cut off.

The machine or apparatus which embodies my present invention, and which will be hereinafter described, accomplishes all of the results named above and by means of comparatively-simple mechanism actuated by a pull.

In the accompanying drawings, which serve to illustrate the construction and operation of my register.

The primary operating element in my machine is a pull which operates partly by its axial rotation and partly by the longitudinal movement of the pull in drawing it out. As herein shown, the machine has one master-pull, which registers the cents from "5" to "95," and, except for the disability that only sums under one dollar can be registered by it, this pull and its attendant mechanisms— viz., for printing, numbering, and severing the checks, unlocking the cash-drawer, sounding the gong, and operating the adder—constitute a complete cash-register. However, I prefer to add to the master-pull one or more other pulls by which "dollars" may be registered. These are controlled by the master-pull to some extent, as will be described.

1 is a suitable base in which is mounted a cash-drawer 2, adapted when released to be pushed out by a spring 3. (See Fig. 5.) On the base 1 is mounted a metal frame 4 to support the operative mechanism of the register, which latter is inclosed in a suitable casing 5. (Seen in section in Figs. 3, 4, and 5.)

Figure 1:
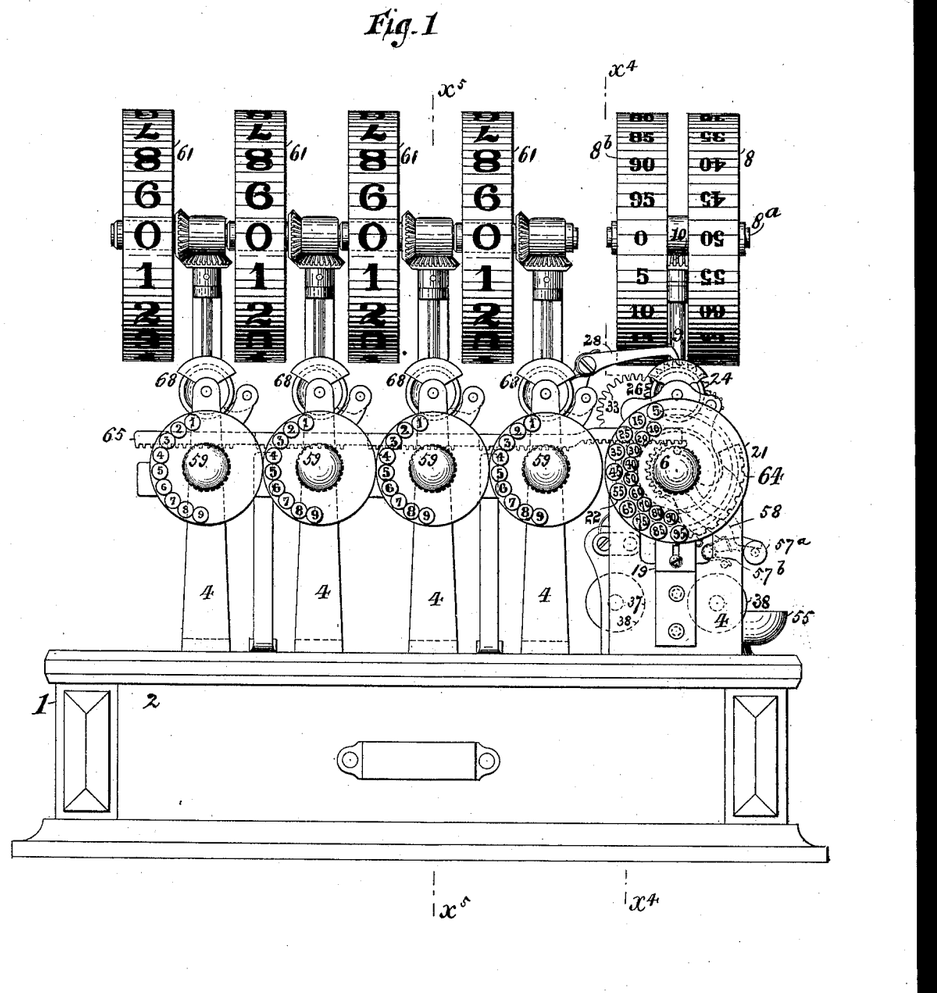
Figure 1 is a front elevation of the register as it appears when the outer casing is removed.
Figure 2:
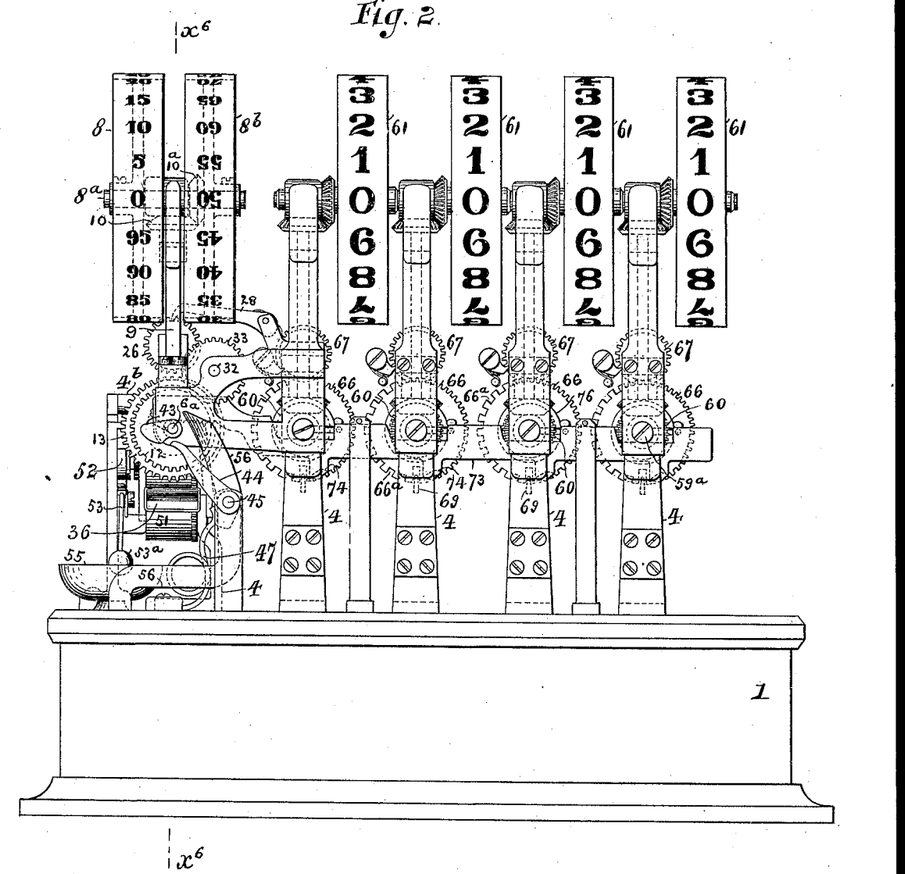
Fig. 2 is a similar rear elevation.
Figure 3:
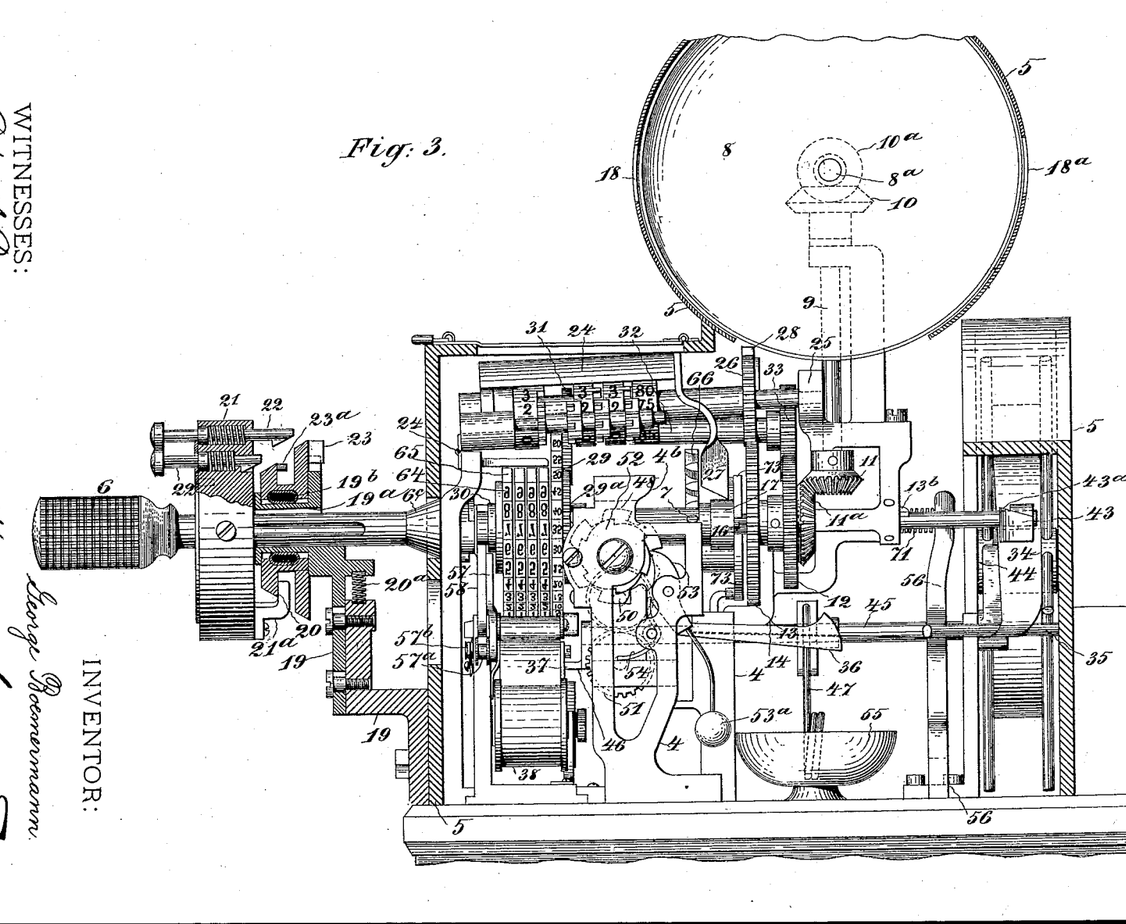
Fig. 3 is an elevation, on a larger scale, of the right-hand end of the machine, the casing and a part of the stop mechanism of the master-pull being in section.
Figure 4:
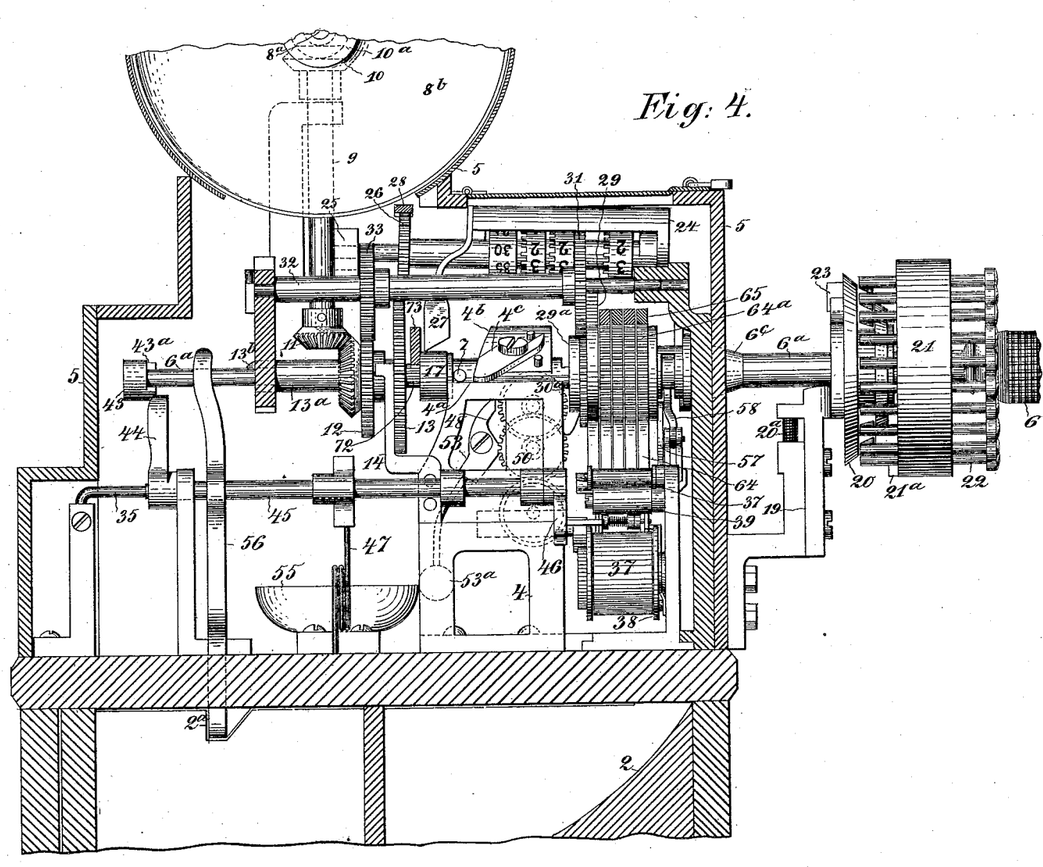
Fig. 4 is a transverse vertical section of the machine, on the same scale as Fig. 3, taken in the plane indicated substantially by line $x^4 x^4$ in Fig. 1.
Figure 6:
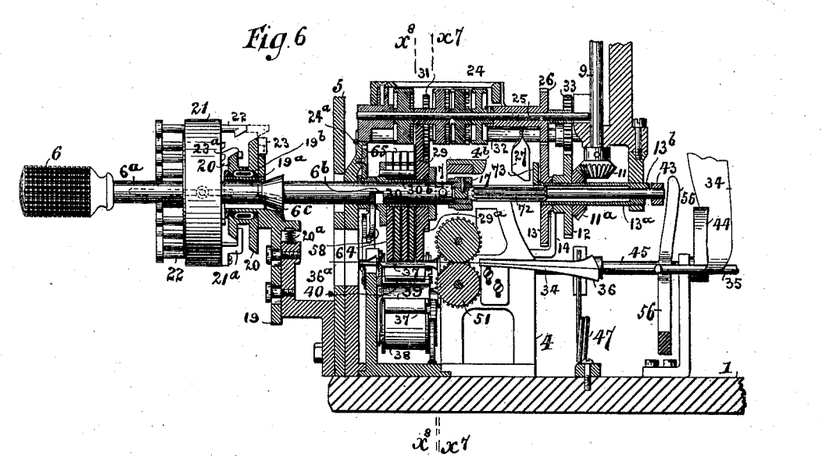
Fig. 6 is a transverse vertical section taken in the plane indicated substantially by line $x^6 x^6$ in Fig. 2.

At the right in Fig. 1 is seen the master-pull 6, the construction, functions, and operation of which I will now describe. This pull is in the nature of a roughened handle, as here shown, which projects out from the front of the machine and is fixed to a spindle $6^a$, rotatively mounted in the machine-frame and forming a part of the pull. In the spindle $6^a$ is a laterally-projecting operating-stud 7, which when the parts are in their normal positions (see Fig. 4) bears on a fixed guide part $4^a$ of the frame 4 and prevents rotation of the spindle any farther in one direction—to the left, as here shown. On the frame 4 above the pull 6 is mounted a wheel 8 with a broad face, on which are marked, in order, the numerals "0," "5," "10," "15," "20," &c., up to "95." These numerals are equally spaced on the wheel, which is fixed on a short shaft $8^a$, rotatively mounted in a bearing in the frame 4. An upright shaft 9, mounted rotatively in the frame, has a bevel-wheel 10 on its upper end, which gears with a corresponding bevel-wheel $10^a$ on the shaft $8^a$, and a bevel-wheel 11 on the lower end of shaft 9 gears with a bevel-wheel 11ª, rotatively mounted on the spindle 6ª of the pull. The bevel-wheel 11ª and two spur-wheels 12 and 13 are united by a sleeve 13ª, which embraces the spindle of the pull and is adapted to rotate on the same. This sleeve and the wheels it joins together are prevented from moving endwise along the spindle by means of a fixed finger 14 on the frame, which takes between the wheels 12 and 13, as seen in Fig. 6. It will be obvious that rotation of the united toothed wheels 11ª, 12, and 13 will impart rotation to the numeral-bearing wheel 8 through the medium of the intermediate gearing described, and in order that the wheel 13 may be rotated by means of the pull-spindle I provide said spindle with a driving-stud 16, fixed in the face of an enlargement or boss 17 on the spindle and adapted when the pull is pushed in or "home," to engage a socket or hole in the wheel 13. Figs. 3 and 4 show the pull pushed in, and Fig. 3 shows the stud 16 engaged with the socket in wheel 13. Now while the parts are in this position the "0" on wheel 8 will appear at the sight-aperture 18 in the drum-like portion of the casing 5, which houses said wheel 8, and if I wish to bring any other numeral, as "25," for example, to said aperture I have only to grasp the pull 6 and turn it to the right until the numeral "25" appears at the aperture, and not rotate it any farther. It is rather difficult, however, to effect this movement quickly and with certainty without some form of stop device to properly limit the movement, and the stop device I prefer to employ for this purpose will now be described with especial reference to Figs. 1, 3, and 6.

On the front of the casing 5, below the master-pull, is fixed a bracket 19, and on this bracket is mounted a circular disk 20, with a beveled margin. This disk is normally concentric with the spindle of the pull, which plays through it, and said disk has a vertical movement, being slotted at the point of attachment to the bracket. It is upheld by a spring 20ª. On the pull-spindle is splined a circular carrier 21, free to rotate with the spindle and having mounted in it spring-retracted push-pins 22, arranged in a circle concentric with the spindle and having buttons or heads on their outer ends and hooks on their inner ends. On the heads of these pins (see Fig. 1) will be marked the numerals "5," "10," "15," &c., as seen in Fig. 1. Now when the salesman desires to set the wheel 8 so that a certain numeral will appear at the sight-aperture 18—as "25," for example—he grasps the pull 8, and at the same time pushes in the pin marked "25" with his thumb. The effect of this is to cause the hooked extremity of the pin pressed upon to wipe over the beveled edge of the disk 20 and to engage therewith, so that the spring of the pin cannot retract it. He then turns the pull to the right until the inner extremity of the pin, which projects inward beyond the disk 20, strikes a stop-piece 23 on the said disk or on the bracket 19, if preferred. The numeral "25" will now appear at the sight-aperture 18 and the stop-piece will prevent the pull from being turned any farther toward the right. In order to allow the disk 20 to yield a little as the hook on the stop-pin wipes over it, I mount it loosely on a collared sleeve 19ª, forming part of the bracket 19, and place a rubber cushion or spring 19ᵇ within the eye of the disk and embracing said sleeve. The stop-piece 23 on the disk engages a slot in a flange on the sleeve and stops the disk against rotation. The operator may press upon more than one of the push-pins with his thumb so long as none to the right of the desired pin is pushed in. For example, if the pin marked "25" be pushed in, the pins marked "30" and "35" may be pushed in with it without detriment, but not pins "20," "15," &c. This is somewhat important, as the pins must be placed quite close together and the thumb will usually bear on more than one at a time. Indeed, so many push-pins will be required at the master-pull that in order to avoid making the carrier 21 very large I have arranged the pins in two ranks and employed two retaining-disks 20—one for each row. However, these disks are united and may be considered as one. They are clearly illustrated in Figs. 3 and 6. The carrier is prevented from moving in and out with the pull-spindle by means of a lug or finger 21ª thereon, which takes behind one of the disks 20. The pins of the inner circle are arrested by a stop-piece 23ª on the lesser disk 20, or it may be on the larger disk and arranged between the two disks 20. I do not consider the retention of the pin when pushed in as absolutely essential to my machine; but it renders the machine less liable to error when operated hurriedly. The rotation of the pull 6 to the right up to the stop-pin not only sets the numeral-bearing wheel 8, but also the type-wheel for printing the check. This type-wheel 29 is mounted rotatively on a collared sleeve 30, (see Fig. 6,) which sleeve is mounted rotatively on the spindle of the pull, and on said type-wheel is fixed a gear-wheel 29ª. This latter wheel gears with a wheel 31, fixed on a shaft 32, and another wheel 33, fixed on this shaft, gears with the wheel 12. Hence the type-wheel will be rotated and set at the same time that the wheel 8 is rotated and set. Having set the wheel 8 and the type-wheel 29 as described, the operator next draws the master-pull out until the operating-stud 7 strikes a block 4ᵇ, forming a part of the frame 4. This partial withdrawal of the pull effects several important results, which require explanation. In the first place it withdraws the driving-stud 16 from the socket or hole in wheel 13, whereby further rotation of the pull to the right does not affect the wheel 8, and, secondly, it puts the adder in gear, as I will explain. The adder 24 is arranged above the pull-spindle and its wheels are mounted in a slotted casing hinged to the machine-frame at 24ª, as seen in Fig. 3. The adding mechanism may be of the usual kind, and will need no minute description. That shown in my patent, No. 456,133, will serve. The shaft 25 of the adder has fixed on its inner extremity a spur-wheel 26, arranged over the wheel 13 and held up and out of gear with said wheel 13 by a pendent arm 27 on the adder-casing, the lower beveled end of which rests on the boss 17 on the pull-spindle. While upheld in this manner the teeth of the wheel 26 engage a spring-pawl 28 on the machine-frame, and thus accidental rotation of the adding-wheels is prevented. The partial withdrawal of the pull displaces the boss 17, allows the arm 27 to fall, and permits the wheel 26 to gear with the wheel 13. The operation of the adder is effected later, as will be hereinafter described. Thirdly, the partial withdrawal of the pull effects the printing and numbering of the check or ticket, and I will now explain how and by what means this is effected.

At the back of the casing 5 is rotatively mounted a reel or holder of any kind, bearing a roll of paper 34 in the form of a strip of the proper width, the end of which strip is led forward over an obliquely-arranged guide 35 in order to change the direction, thence through a flattened tube-like guide 36, and thence under the type-wheel 29 to an aperture 36ª in the front of the casing.

Figure 7:
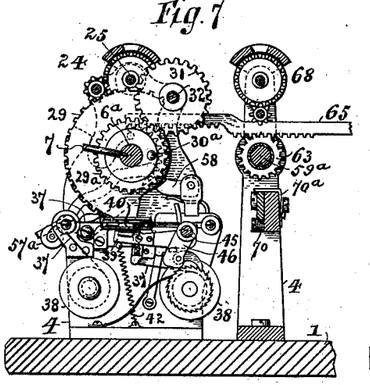
Figs. 7 and 8 are transverse sections illustrating certain details of the machine. These views are taken, respectively, in the planes indicated substantially by lines $x^7 x^7$ and $x^8 x^8$ in Fig. 6.

The device for numbering the check and for pressing the paper up to the type-wheel, the inking-ribbon, and the cutter for severing the check from the strip will be by preference mounted in a separate frame and fitted into the main frame. This mechanism is seen in rear elevation in Figs. 7 and 8 and detached and enlarged in Figs. 13 and 14.

The inking-ribbon 37 is mounted on spools 38 and passes over guides in a well-known way, its horizontal upper portion being between the lower face of the type-wheel 29 and the strip of paper 34. The impression is effected by means of a swinging platen composed of a vibrating frame 39 and an impression-block 40, which is carried in the free end of said frame. This block presses the strip of paper and the ribbon up against the type-wheel at the printing-point, whereby the figures indicating the amount received are printed on the upper face of the strip of paper. The checks are numbered consecutively, the number being printed on the back or lower face of the strip of paper simultaneously with the printing of the figures on its upper face by means of an ordinary numbering device 41, mounted in the vibratory frame 39 and adapted to shift the numbers automatically at each vibration of said frame. The printing of the numbers is effected by a lower part of the inking-ribbon 37, which passes between the type-wheels of the numbering device and the lower face of the strip of paper. As this numbering device is not new with me, and as it is not absolutely essential to my invention, it will not be necessary for me to describe it minutely. Normally the vibratory frame of the platen is held depressed by a spring 42, and I will now explain how it is pressed upward, so as to effect the printing, by the first partial withdrawal of the master-pull.

Figure 13:
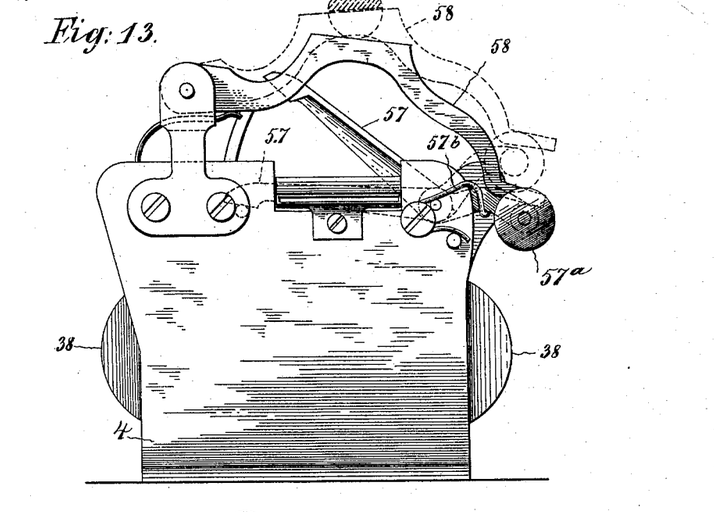
Figs. 13 and 14 are respectively front and rear elevations of the mechanism for printing and severing the check, detached and on a large scale.
Figure 14:
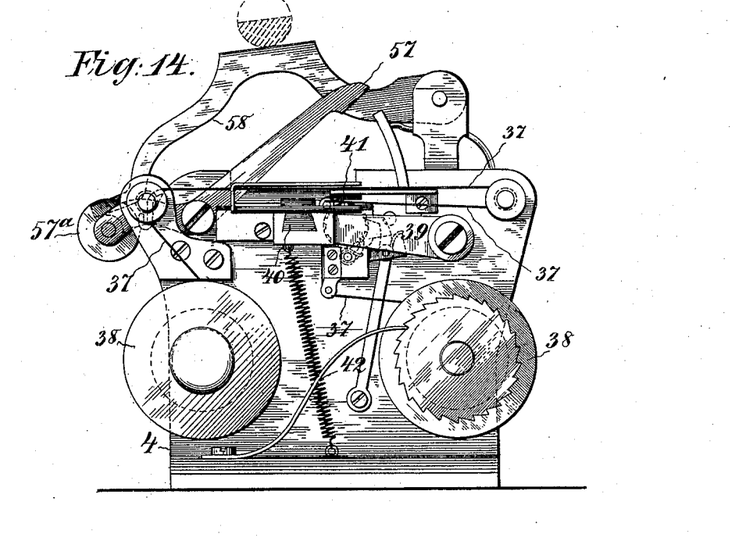

On the inner extremity of the pull-spindle 6ª is secured a wiper or cam 43, which has a beveled face, and when the pull is partly withdrawn the beveled face of this wiper takes under an arm 44 on a rock-shaft 45 and rocks the latter. On the end of the rock-shaft 45 adjacent to the printing device is a crank-arm 46, which takes under the vibratory frame 39 of the platen, and when the said shaft 45 is rocked this crank-arm forces the platen (see Figs. 13 and 14) upward and effects the printing. The wiper passes by the arm 44 and allows a spring 47 to rock the shaft 45 back again. This spring 47 is not, however, absolutely essential, as the spring 42, which retracts the platen, will also serve to return the rock-shaft. The operator having drawn out the pull until the operating-stud 7 bears on the face of the block 4ᵇ, he cannot draw it out any farther until he rotates the pull farther to the right. The extent of this rotation will depend upon how far he has rotated the pull primarily in setting the wheels 8 and 29; but he must in any case now rotate it as far to the right as possible, and the extent of its rotation will be limited by the engagement of the stud 7 with a notch in a notched or toothed wheel 48, rotatively mounted in the frame. The face of the block 4ᵇ guides the stud 7 into the said notch between adjacent teeth of the wheel 48, and when said stud shall have entered said notch the stud will project out toward the right in about a horizontal plane. The operator now draws out the pull to its full extent, and this movement of the pull effects several important results. In the first place it feeds forward the strip of paper 34 to an extent sufficient to cause the extremity of the same, on which the figures and numerals have been printed, to protrude through the slit in the casing. This is effected through the medium of the notched wheel 48, which will be rotated to a predetermined extent by the stud 7 as the pull is drawn out. On the same shaft with the wheel 48 is secured a toothed wheel 49, which gears with a pinion 50 on the journal of the upper one of a pair of feed-rollers 51, between which the strip of paper 34 passes on its way to the printing device. I have shown six notches in the wheel 48, and when the pull is drawn out said wheel will be rotated to the extent of one-sixth of a complete rotation. Secondly, the final withdrawal of the master-pull sounds a gong. This is effected by means of a ratchet-wheel 52, fixed to the notched wheel 48, which acts on the tail of the pivoted hammer-arm 53 to draw back the hammer 53ª, and when the ratchet-tooth passes the said tail a spring 54 causes the hammer to strike the gong 55 a smart blow. Thirdly, the final withdrawal of the master-pull unlocks the cash-drawer 2 and allows its spring to push it out. This is effected by the wiper 43, (the same which effects the printing.) The wiper by this final withdrawal of the pull passes and displaces or pushes back the upper end of a pivoted locking-lever 56, the lower end of which is thus displaced from a locking-notch 2$^a$ in the side of the drawer (see Fig. 4) and the latter set free. When the drawer is pushed in, this lever again falls into place and locks the drawer. Fourthly, the final withdrawal of the master-pull allows the cutter to cut off the protruded end of the strip of paper, or, in other words, to sever the printed extremity which forms the check. This is effected as follows: On the frame which carries the inking-ribbon and vibrating platen is pivotally mounted the cutting-blade 57, and this blade is normally upheld by an arched pivoted arm 58, the free end of which rests on a grooved antifriction-roller 57$^a$, mounted on the heel of the cutting-blade back of the pivot of the blade. The arm 58 is held in a depressed position normally by the spindle 6$^a$ of the master-pull, which prevents said arm from rising and at the same time holds the cutting-blade elevated; but when the pull is drawn out to its fullest extent a deep notch 6$^b$ in one side of the pull-spindle is brought to register with the arm 58, and this frees said arm and allows the strong operating-spring 57$^b$ of the cutting-blade to drive it forcibly down onto the strip of paper and shear it off. The blade 57 acts as one blade of a pair of shears, the frame in which the mechanism is mounted serving as a fixed blade. In Fig. 13 the dotted lines show the position of the parts when the cutting-blade is depressed in severing the check, and in Fig. 14 the spindle 6$^a$ is represented in dotted lines. Fifthly, the push-pins 22 are all released from the united disks 20 when the pull is finally withdrawn. This result is effected by a conical sleeve or shoulder 6$^c$ on the spindle of the pull, which is caused to depress said disks far enough to free the hooks on the pins and allow their springs to retract them. The master-pull being now fully drawn out, it is necessary to push it in again or home, and in order to do this it is necessary to turn it back to the left about one-half of a turn, or, in other words, back to its original position, with the operating-stud 7 resting on the guide part 4$^a$ of the frame. I will say here that the guide 4$^a$ may be merely a horizontal bar parallel with the pull-spindle 6$^a$ and arranged at about the level of the latter. Its function is to form a limiting-stop and guide for the stud 7. It is necessary to rotate the spindle to the left up to the guide 4$^a$ in order to set the numeral-bearing wheel 8 and the type-wheel 29 back to their normal positions and to operate or set the adder. This is effected by the means I will now describe. On the rear or inner end of the sleeve 13$^a$ (on which are fixed the three wheels 11$^a$, 12, and 13) at the point where it has a bearing in the frame is a rearwardly-projecting toe or stud 13$^b$, and on the wiper 43 (fixed on the pull-spindle) is a shoulder 43$^a$. When the master-pull is drawn out to its fullest extent, this shoulder on the wiper 43 will be in position to engage the stud on the sleeve 13$^a$ when the pull is rotated to the left, and consequently such rotation effects the rotation of the sleeve 13$^a$ and through it the rotation of the numeral-bearing wheel 8 and type-wheel 29 back to their first or normal positions. This rotation also brings the socket in the wheel 13 in proper position to receive the driving-stud 16 when the pull is pushed in home, and it also operates or sets the adder through the medium of the wheels 26, 13, 12, 33, 31, and 29$^a$, the latter being fixed to the type-wheel 29.

The next or final operation is to push the master-pull in home, the operating-stud 7 being guided in its movement by the guide 4$^a$, along which it moves. The driving-stud 16 will then enter the socket in the wheel 13 and lock this wheel again to the spindle of the pull. When the pull is thus pushed in, the stud wipes by a pivoted spring-detent 4$^c$ on the block 4$^b$, and when the stud has passed it this detent drops behind the stud and prevents the pull from being drawn back again without first rotating it to the right. This detent forms practically a part of the guide-block 4$^b$, the purpose of which is to form a limiting-stop and a guide to guide the stud 7 into the notch in the wheel 48.

I prefer to employ two numeral-bearing wheels, both alike and both fixed to the same shaft 8$^a$, but having the numerals on their respective faces so placed that when a numeral on the wheel 8 (before described) appears at the sight-aperture 18 in the front of the casing 5 the same numeral on the wheel 8$^b$ will appear at a sight-aperture 18$^a$ in the rear of the casing. This wheel 8$^b$, however, is not essential to the operation of the register.

Figures 11, 12:
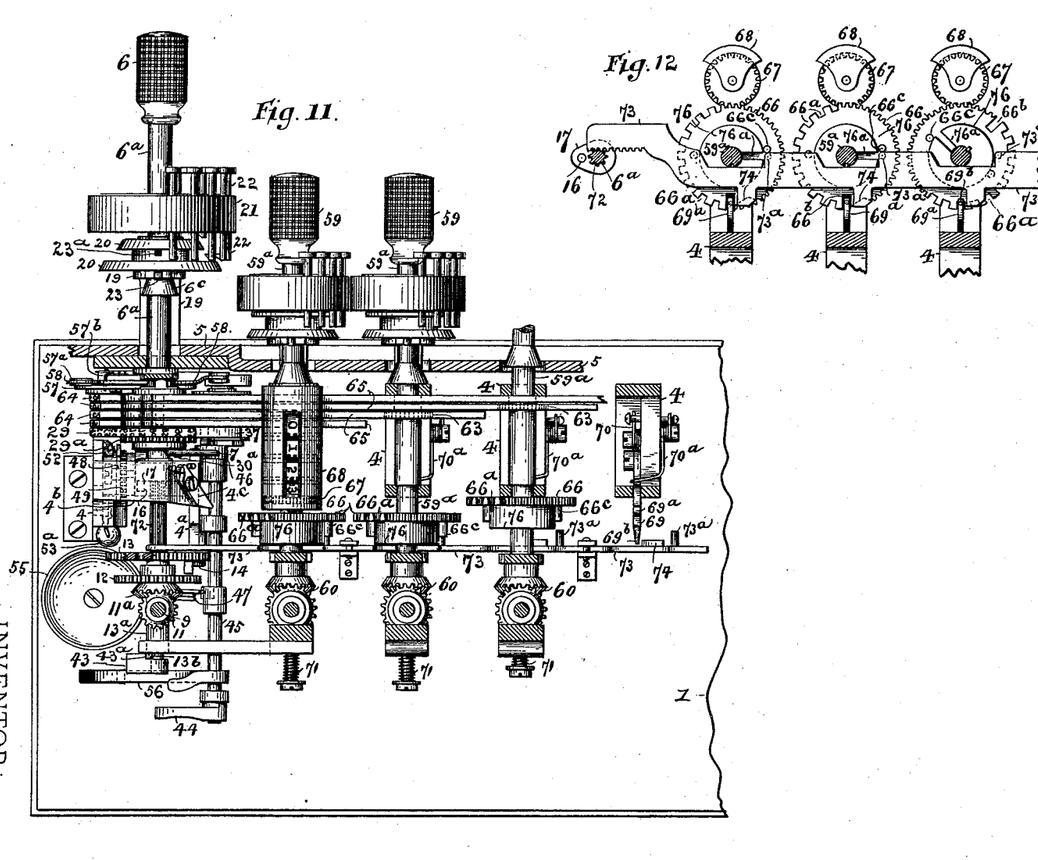
Fig. 11 is a fragmentary sectional plan view of the machine.
Fig. 12 is a detached fragmentary detail view illustrating the locking mechanism of the pulls.

I will now describe the auxiliary or dollar pulls, premising that as any number of these pulls may be employed and that all have connected with them like mechanisms a minute description of one will suffice for all, and I have employed the same letters of reference for corresponding parts of all of them. 59 is the dollar-pull and 59$^a$ its spindle, (see Fig. 5,) mounted in bearings in the frame in a manner similar to the spindle of the master-pull. On the spindle 59$^a$ is splined a bevel-wheel 60, which when the pull is rotated rotates a numeral-bearing wheel 61 through intermediate gearing which is the same or may be the same as that whereby the master-pull rotates the numeral-bearing wheels 8 and 8$^b$. The wheel 61 has marked on its face a set of ten digits, which may be brought to appear in succession at a sight-aperture 62 in the casing 5, (see Fig. 5,) and another set of ten digits which will be brought to appear in succession and simultaneously at a sight-aperture 62ᵃ in the rear of the casing. This doubling of the numerals on the wheel so that the same numeral may appear at both the front and rear of the casing at the same time is not essential to the operation of the register, and may be employed or omitted at pleasure. On each of the several spindles of the dollar-pulls is splined a pinion 63 for operating the type-wheel 64, corresponding to the pull, through the medium of a rack-bar 65. The several type-wheels for these dollar-pulls are mounted rotatively on the sleeve 30 between the collars thereon, (see Fig. 6,) these type-wheels and the type-wheel 29 being arranged abreast, so that the types thereon will be brought properly into line for printing. Each of the type-wheels 64 has a toothed wheel portion 64ᵃ, (see Fig. 8,) which is in gear with the rack on that extremity of the rack-bar 65. When the operator rotates a pull 59 to the right in order to set the numeral-bearing wheel 61, he also sets the type-wheel 64, belonging to that pull, through the medium of the pinion 63 and rack-bar 65. After setting the parts by rotating the pull the operator draws the pull out as far as it will come. This produces two results—namely, in the first place it causes the gear-teeth on a wheel 66, fast on the spindle of the pull, to gear with the teeth of the gear-wheel 67 of the adder 68. This adder will be the same in principle and operation, or may be the same, as the adder 24, used in connection with the master-pull. In the second place this drawing out of the pull locks it against rotation in either direction by causing a spring-dog 69, mounted on the frame, to engage one of the several locking-notches 66ᵃ in the wheel 66, and thus hold the latter fast. The dog 69 has springs 70 and 70ᵃ, one below it and the other above it, which tend to hold it normally in one position, but permit it to be both elevated and depressed, the springs returning it to its normal position when the pressure is removed. When the pull is drawn out, the wheel 66 is drawn over a beveled detent 69ᵃ on the dog, thus depressing the latter until the wheel passes the detent, when the spring 70 returns the dog to its normal elevation. The dog now occupies a locking-notch in the wheel and prevents rotation of the pull, and the detent 69ᵃ stands behind the wheel and prevents the pull from being pushed in home again. Fig. 12 shows this locking mechanism and the form of the wheel 66 very clearly. The operator cannot operate the dollar-pull thus drawn out except through the master-pull 6, and when this latter pull is manipulated, as before described, it serves to unlock any dollar-pull that may be pulled out and to rotate said pull back to its normal position, when a spring 71 on the inner end of the spindle of the dollar-pull retracts or draws the latter in.

Figure 5:
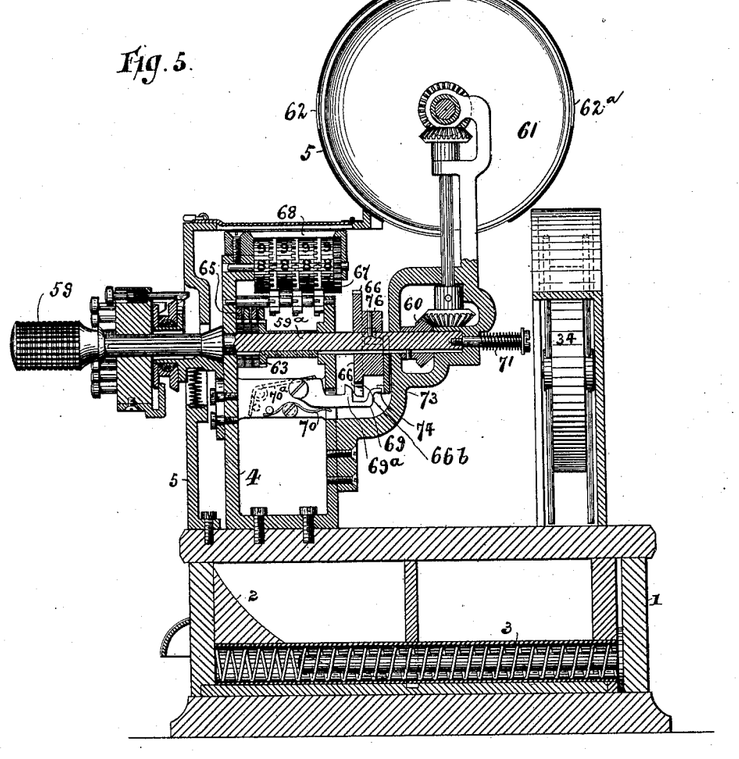
Fig. 5 is a transverse vertical section taken in the plane indicated substantially by the line $x^5 x^5$ in Fig. 1.
Figure 8:
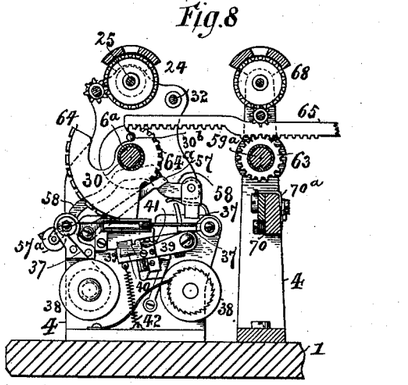
Figure 9:
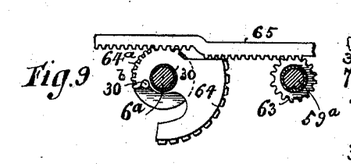
Figs. 9 and 10 are detached fragmentary detail views that will be hereinafter described.
Figure 10:
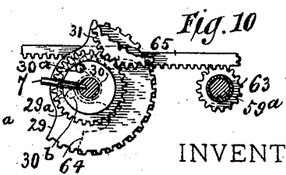

I will now describe the mechanism whereby the master-pull controls the dollar-pull. On the spindle of the master-pull 6 is fixed a long pinion 72, which is always in gear with a rack on a locking and unlocking rack-bar 73, mounted in guide-bearings in the frame, as shown. On this bar at the rear of the lower part of the wheel 66 is a cam-plate 74, (see Fig. 12,) arranged to engage the extremity 69ᵇ of the dog 69. When the master-pull is rotated to the right, the rack-bar 73 is also moved to the right, the cam-plate 74 moving under the end 69ᵇ of the dog and elevating the latter slightly in its passage, and when the master-pull is rotated back again to the left the cam-plate 74 moves back over the end of the dog, thus depressing it sufficiently to unlock the wheel 66, so that it may rotate, but not to an extent sufficient to clear the detent 69ᵃ on the dog, so that the spring 71 can draw in the pull. While the dog is thus held depressed, the dollar-pull is rotated back to its normal position by means I will now describe. In one of the flanges or collars on the sleeve 30 (the inner flange) is fixed a stud 30ᵃ, which projects into the path of the operating-stud 7 on the spindle of the master-pull at the time when the latter is being rotated back toward the left, and in the inner face of one of said flanges or collars on the sleeve 30 is fixed another stud 30ᵇ, (see Figs. 9 and 10,) which projects across the path of the type-wheel 64, as seen in Fig. 8. Consequently when a dollar-pull is rotated to the right the type-wheel 64, connected with it and rotated by it, strikes the stud 30ᵇ as said type-wheel rotates and through it carries the sleeve 30 around. This movement of the sleeve 30 of course sets the stud 30ᵃ at some point in the path of the stud 7, and in consequence when the master-pull is rotated back toward the left just prior to pushing it in the stud 7 strikes the stud 30ᵃ and through it rotates the sleeve 30 to the left. The stud 30ᵇ thus acts in turn to rotate the type-wheel 64 back to its normal position, and the latter, acting through the rack-bar 65 and pinion 63, rotates the dollar-pull to the left, thus setting the numeral-bearing wheel 61 back to "0" and operating the adder 68, which at this time is in gear with the wheel 66. When the dollar-pull shall have been rotated to the left to its full extent, a deep releasing-notch 66ᵇ in the wheel 66 will be brought to register with the detent 69ᵃ on the dog, and thus the pull will be released, so that the spring 71 can instantly draw it in. So long as the dollar-pull is not rotated it may be drawn out and pushed in freely; but when rotated to any extent it will be obvious that the deep notch 66ᵇ will be put out of coincidence with the dog 69, and then when drawn out the pull will be locked in that position. When the master-pull is rotated to the right, it locks against rotation all of the dollar-pulls that have not been drawn out. On the spindle of each dollar-pull and forming a part of the wheel 66, as here shown, is a boss 76, which has in it a radial slot 76ᵃ, and this slot is so placed that when the pull is in its normal position the slot will be horizontal and in the path of a short stud 73ª on the rack-bar 73. When this bar is moved to the right by the rotation of the master-pull, the stud 73ª enters the slot 76ª and prevents rotation of the dollar-pull. However, when the latter pull is drawn out the slotted boss will be clear of the stud 73ª. The back rotation of the dollar-pull is limited by a stop-pin or projection 66ᶜ on the wheel 66, striking or engaging the stud 73ª on the rack-bar, said stud being at that time in the path of said pin. Respecting the wheel 66, it may be proper to say that there will be nine locking-notches in it so arranged as to be brought successively opposite the detent on the dog 69 as the numerals on the wheel 61 are brought successively to the sight-aperture in the casing, and that the gear-teeth on the upper part of wheel 66 will also be arranged to move into gear with the teeth of the adder-wheel whenever a locking-notch is engaged by the dog 69. The dollar-pulls will each be provided with hooked push-pins like the pins 22, before described with reference to the master-pull and the mechanisms connected therewith. These are fully illustrated and need not be minutely described, as they operate in precisely the same way as the pins 22. In Fig. 5 one of the push-pins is shown pushed in and in engagement with the beveled disk.

Having thus described my invention, I claim—

1. In a cash register, indicator, and check-printer, the combination, with a casing having a sight-aperture and a numeral-bearing wheel rotatively mounted in said casing, of rotatively-mounted pull and its spindle, said spindle having a stud 16, which engages a socket in a wheel 13, rotatively mounted on the spindle, intermediate mechanism between said wheel 13 and the numeral-bearing wheel, whereby the latter wheel partakes of the rotation of the pull until disengagement is effected by the drawing out of the spindle, mechanism for feeding the check-strip into the printing device, a stud on the spindle which actuates said feeding mechanism when the pull is drawn out, the check-printing mechanism, and means, substantially as described, whereby the drawing out of the pull operates said printing mechanism, substantially as set forth.

2. In a cash-register, the combination, with the frame and casing, the pull 6, and its spindle mounted rotatively therein and provided with a boss 17 and stud 16, of the adder 24, hinged to the casing and upheld normally out of gear by the boss 17, the gear-wheel 13, mounted rotatively on the pull-spindle, and the gear-wheel 26 on the shaft of the adding mechanism and arranged to gear with the wheel 13 when the said mechanism is allowed to descend, as set forth.

3. In a cash-register, the combination, with the casing, the frame, the rotatively-mounted numeral-bearing wheel 8, the rotatively-mounted pull 6 and its spindle, the connected gear-wheels 12 and 13, rotatively mounted on said spindle, and intermediate gearing between the said wheels and the wheel 8, of the type-wheel 29, mounted to turn loosely about the sleeve 30 on the pull-spindle, the said sleeve, the gear-wheel 29ª on the type-wheel, the shaft 32, and the wheels 31 and 33 on said shaft, gearing, respectively, with the wheels 29ª and 12, whereby the wheels 29 and 8 are set simultaneously.

4. In a cash-register, the combination, with the pull 6 and its spindle provided with a stud 7, of the guiding-block 4ᵇ, the notched wheel 48, adapted to be engaged by the stud 7, the feed-rollers 51, and the intermediate gearing between the wheel 48 and said rollers, whereby the withdrawal of the pull effects the rotation of the feed-rollers to a predetermined extent.

5. In a cash-register, the combination, with the pull 6 and its spindle provided with a stud 7, of the guiding-block 4ᵇ, the notched wheel 48, adapted to be engaged by the stud 7 when the pull is withdrawn, the notched wheel 52, secured to the wheel 48, the spring-hammer adapted to be drawn back by the wheel 52, and the gong 55, substantially as set forth.

6. In a cash-register, the combination, with the pull 6 and its spindle provided with a notch 6ᵇ, of the cutting-blade 57, the spring which actuates said blade when freed, and the arched arm 58, arranged between the blade and the spindle of the pull, whereby the said blade is held normally in an elevated position, as set forth.

7. In a cash-register, the combination, with the pull 6 and its spindle provided with a wiper 43, of the sleeve 13ª on said spindle, provided with a projecting toe 13ᵇ, engaged by said wiper when the pull is drawn out, the toothed wheel 12 on said sleeve, the shaft 32, the wheels 31 and 33 thereon, the type-wheel 29, and the gear-wheel 29ª thereon, substantially as set forth.

8. In a cash-register, the combination, with the pull 6 and its spindle provided with a wiper 43, of the sleeve 13ª on said spindle, provided with a toe 13ᵇ, engaged by said wiper when the pull is drawn out, the bevel-wheel 11ª, fixed on said sleeve, the numeral-bearing wheel 8, and intermediate mechanism between said wheels 11ª and 8, substantially as set forth.

9. In a cash-register, the combination, with the pull 6 and its spindle provided with a wiper 43, of the sleeve 13ª on said spindle, provided with a toe 13ᵇ, engaged by the said wiper when the pull is drawn out, the wheel 13, fixed on said sleeve, and the adder 24 in gear with said wheel 13, substantially as set forth.

10. In a cash-register, the combination, with a pull 6 and its spindle provided with a beveled wiper 43, of a type-wheel, means for setting said type-wheel through the rotation of the pull, an inking-ribbon arranged under the type-wheel, means for feeding a strip of paper under said ribbon through the drawing out of the pull, an impression-block 40, carried by a vibrating frame 39, the said frame, a rock-shaft 45, arms 44 and 46 on said shaft, the former being acted upon by said wiper and the latter acting to raise the frame 39, and a spring to retract the parts.

11. The combination, with a numeral-bearing-wheel, of a rotatively-mounted pull, intermediate gearing connecting said pull and wheel, and means for limiting the rotation of said pull in setting the wheel, said means comprising a carrier on the pull-spindle, a series of spring push-pins mounted in said carrier, and a fixed stop-piece arranged in the path of the pins when pressed in by the operator, the said pins corresponding with the respective numerals on the wheel, substantially as and for the purposes set forth.

12. The combination, with a numeral-bearing wheel having in it two oppositely-arranged sets of numerals, of an inclosing casing having front and rear sight-apertures whereat like numerals of the two series on the wheel appear simultaneously, a rotatively-mounted pull, and intermediate gearing between said wheel and pull, whereby rotation of the pull rotates the said wheel.

13. The combination, with the pull 6 and its spindle provided with a beveled collar $6^c$, of the carrier 21, splined on said spindle, the spring-retracted push-pins mounted in said carrier and having hooked extremities, the depressible retaining-disk mounted on a bracket on the frame and normally concentric with the spindle, the said bracket and frame, and the spring which supports said disk, all operating substantially as set forth.

14. In a cash-register, the combination, with a pull 59 and its spindle, the gear-wheel 60, splined on said spindle, the numeral-bearing wheel 61, and intermediate gearing between said wheels 60 and 61, of the adder 68, provided with a toothed wheel 67, the wheel 66, fixed on the spindle of the pull 59 and furnished with teeth to engage the wheel 67, locking-notches $66^a$, and an unlocking-notch $66^b$, the dog which locks said wheel against rotation, the master-pull 6 and its spindle provided with a pinion 72, the rack-bar 73, means, substantially as described, carried by said rack-bar for actuating said locking-dog, and a spring 71, which retracts the pull when freed.

15. In a cash-register, the combination, with a master-pull 6 and its spindle provided with a pinion 72, of the rack-bar 73, engaging said pinion and provided with a pin or stud $73^a$, a pull 59 and its spindle, and a boss 76 on said spindle provided with a slot $76^a$, with which the stud $73^a$ engages when the master-pull is rotated, thus locking the pull 59 against rotation, as set forth.

16. In a cash-register, the combination, with a pull 6 and its spindle, of a flanged sleeve 30, mounted loosely on said spindle, a type-wheel 64, mounted loosely on said sleeve and provided with teeth $64^a$, a pull 59 and its spindle, a pinion 63, fixed on said spindle, a rack-bar 65, the teeth on which gear with the teeth on the type-wheel 64 and pinion 63, the studs $30^a$ and $30^b$ in the flanged sleeve 30 for returning the type-wheel 64 to its normal position, and the stud 7 in the spindle of the pull 6, arranged to engage the stud $30^a$ and rotate sleeve 30, as set forth.

In witness whereof I have hereunto signed my name in the presence of two subscribing witnesses.

GEORGE BOEMERMANN.

Witnesses:
HENRY CONNETT,
HERBERT BLOSSOM.